United States Patent
Kim

(10) Patent No.: US 11,167,801 B2
(45) Date of Patent: Nov. 9, 2021

(54) FRONT BODY FOR VEHICLE

(71) Applicants: HYUNDAI MOTOR COMPANY, Seoul (KR); KIA MOTORS CORPORATION, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 4 days.

(21) Appl. No.: 16/881,356

(22) Filed: May 22, 2020

(65) Prior Publication Data

US 2021/0024136 A1  Jan. 28, 2021

(30) Foreign Application Priority Data

Jul. 25, 2019  (KR) .................. 10-2019-0089981

(51) Int. Cl.
*B62D 21/15* (2006.01)
*B62D 25/14* (2006.01)

(52) U.S. Cl.
CPC .......... *B62D 21/152* (2013.01); *B62D 25/145* (2013.01)

(58) Field of Classification Search
CPC .... B62D 21/152; B62D 21/15; B62D 25/145; B62D 24/14
See application file for complete search history.

(56) References Cited

U.S. PATENT DOCUMENTS

| | | | |
|---|---|---|---|
| 8,820,823 B1 * | 9/2014 | Shafer | B62D 25/2036 296/204 |
| 2011/0272972 A1 | 11/2011 | Takayanagi | |
| 2019/0016394 A1 * | 1/2019 | Han | B62D 25/2018 |
| 2020/0001929 A1 * | 1/2020 | Ohba | B62D 21/15 |

FOREIGN PATENT DOCUMENTS

| | | | | |
|---|---|---|---|---|
| EP | 3118088 A1 * | 1/2017 | ........ | B62D 25/145 |
| JP | S63-065571 U | 4/1988 | | |
| JP | 3031987 B2 | 4/2000 | | |
| JP | 2003-246277 A | 9/2003 | | |
| JP | 3526537 B2 | 5/2004 | | |
| JP | 2008-230359 A | 10/2008 | | |
| JP | 2012218538 A * | 11/2012 | ........ | B62D 25/2018 |
| WO | 2012/086297 A1 | 6/2012 | | |

* cited by examiner

*Primary Examiner* — Lori L Lyjak
(74) *Attorney, Agent, or Firm* — Lempia Summerfield Katz LLC

(57) ABSTRACT

A front body for a vehicle includes: a front dash cross member disposed under a dash panel and having first and second ends respectively connected to front side members; a front lower cross member extending in a transverse direction of the vehicle; a front center support member extending in a longitudinal direction of the vehicle and located under an engine room of the vehicle; and a center member having a front end connected to the front dash cross member, and extending rearward along a floor of the vehicle. In particular, the front center support member have a front end connected to the front lower cross member and a rear end connected to the front dash cross member.

11 Claims, 3 Drawing Sheets

FRONT BODY FOR VEHICLE

CROSS REFERENCE TO RELATED APPLICATION

Figure 1:
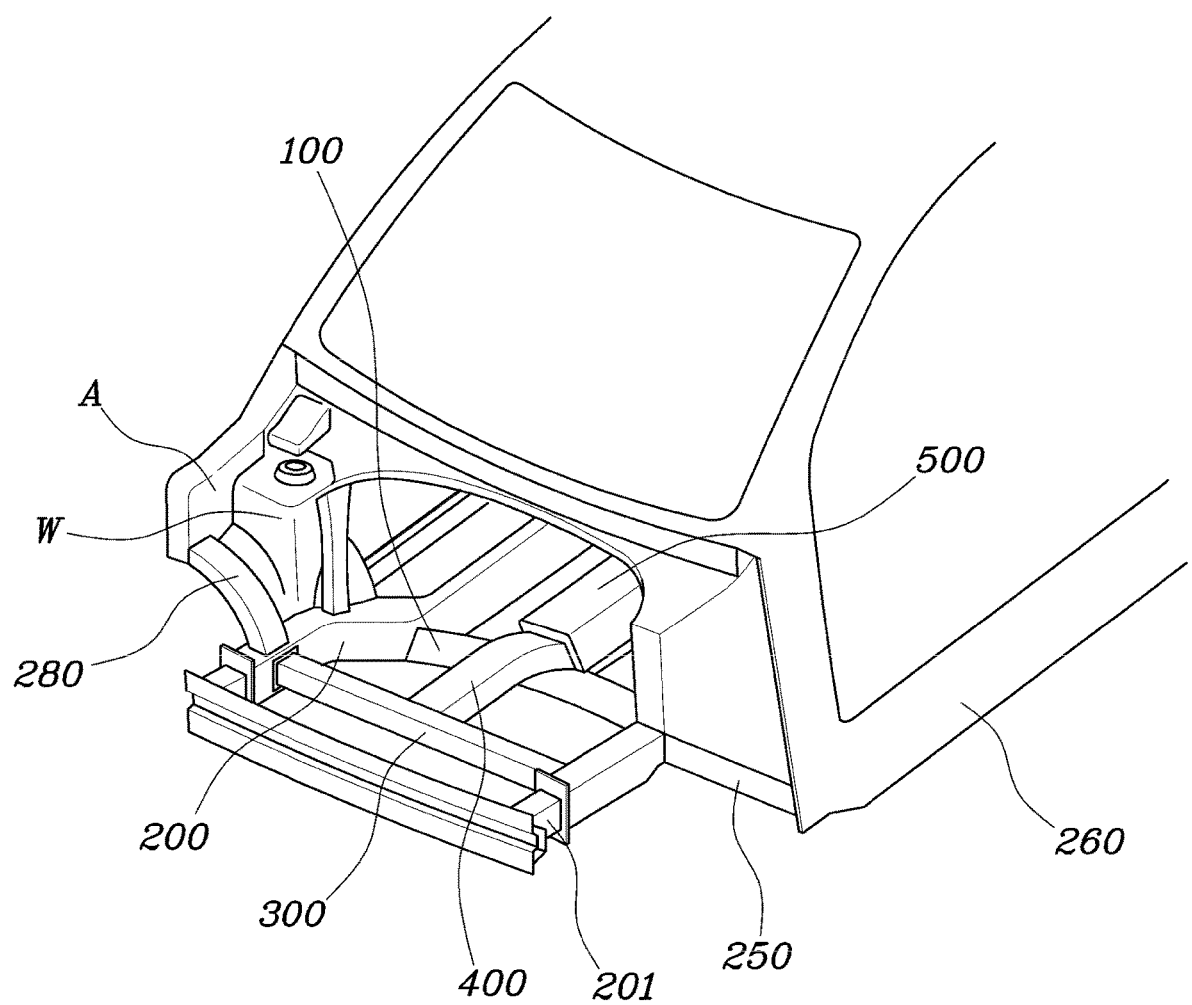

This application claims priority to and the benefit of Korean Patent Application No. 10-2019-0089981, filed on Jul. 25, 2019, the entire contents of which are incorporated herein by reference.

FIELD

The present disclosure relates to a front body for a vehicle that can efficiently reinforce crashworthiness and body stiffness of vehicles.

BACKGROUND

The statements in this section merely provide background information related to the present disclosure and may not constitute prior art.

Since an electric vehicle has no engine, the space of an engine room can be very small, and recently, the front overhang is increasingly shortened and the engine room is increasingly narrowed in accordance with design concepts such an autonomous vehicle.

We have discovered that, according to this design, a front collision absorption space is very insufficient, so it is difficult to secure crashworthiness required for a front collision and protect passengers.

In other words, it is difficult to provide sufficient crashworthiness and protection with the existing bodies having the reduced engine room.

The description provided above as a related art of the present disclosure is just for helping understanding the background of the present disclosure and should not be construed as being included in the related art known by those skilled in the art.

SUMMARY

The present disclosure provides a front body for a vehicle that can efficiently reinforce crashworthiness and body stiffness of vehicles having a very small engine room and a small front overhang such as a small-sized electric vehicle.

In one form of the present disclosure, a front body for a vehicle includes: a front dash cross member disposed under a dash panel, having first and second ends respectively connected to front side members positioned at both sides of the vehicle, and extending in a transverse direction of the vehicle; a front lower cross member disposed at a front lower portion of the vehicle, having first and second ends respectively connected to the front side members, and extending in the transverse direction of the vehicle; a front center support member extending in a longitudinal direction of the vehicle and located under an engine room of the vehicle, where the front center support member includes a front end connected to the front lower cross member and a rear end connected to the front dash cross member; and a center member having a front end connected to the front dash cross member, and extending rearward along a floor of the vehicle.

In one form, the front side members each have a first connection point and a second connection point positioned forward further than the first connection point.

The first connection points of the front side members may be respectively connected to a lower portion of a dash panel, and the front dash cross member may be connected to the first connection points of the front side members.

The second connection points of the front side members may correspond to front ends of the front side members, and the front ends of the front side members are adjacent to a bumper back beam joint. In one form, the front lower cross member may be connected to the second connection points of the front side members.

At least one second connection point among the second connection points of the front side members is connected to a fender apron member by a connection member, and the connection member may extend along a front end profile of a front wheel housing.

The rear end of the front center support member may be directly connected to the front end of the center member, and the front end of the center member may be connected to a center portion of the front dash cross member.

The front dash cross member, the front center support member, and the center member may have a closed cross-section and may be directly or indirectly connected to each other, thereby forming a load path for a front collision and a side collision.

The front dash cross member may include an inner panel positioned inside and an outer panel positioned outside, and a closed cross-section may be formed by combining the inner panel and the outer panel.

The inner panel of the front dash cross member may cover an upper end of the center member.

The outer panel of the front dash cross member may include a left panel and a right panel, and the left panel and the right panel each have an end portion. In one form, the end portions of the left and right panels face to each other and may be respectively coupled to both side ends of the center member.

A lower end of the connection member may be coupled to a top part of the front side members, and the front lower cross member may be connected to a side part of the front side members. The side part of the front side members faces the engine room of the vehicle.

According to the front body for a vehicle of the present disclosure relates tit is possible to efficiently reinforce crashworthiness and body stiffness of vehicles having a small engine room and front overhang such as a small electric vehicle.

Further areas of applicability will become apparent from the description provided herein. It should be understood that the description and specific examples are intended for purposes of illustration only and are not intended to limit the scope of the present disclosure.

DRAWINGS

Figure 2:
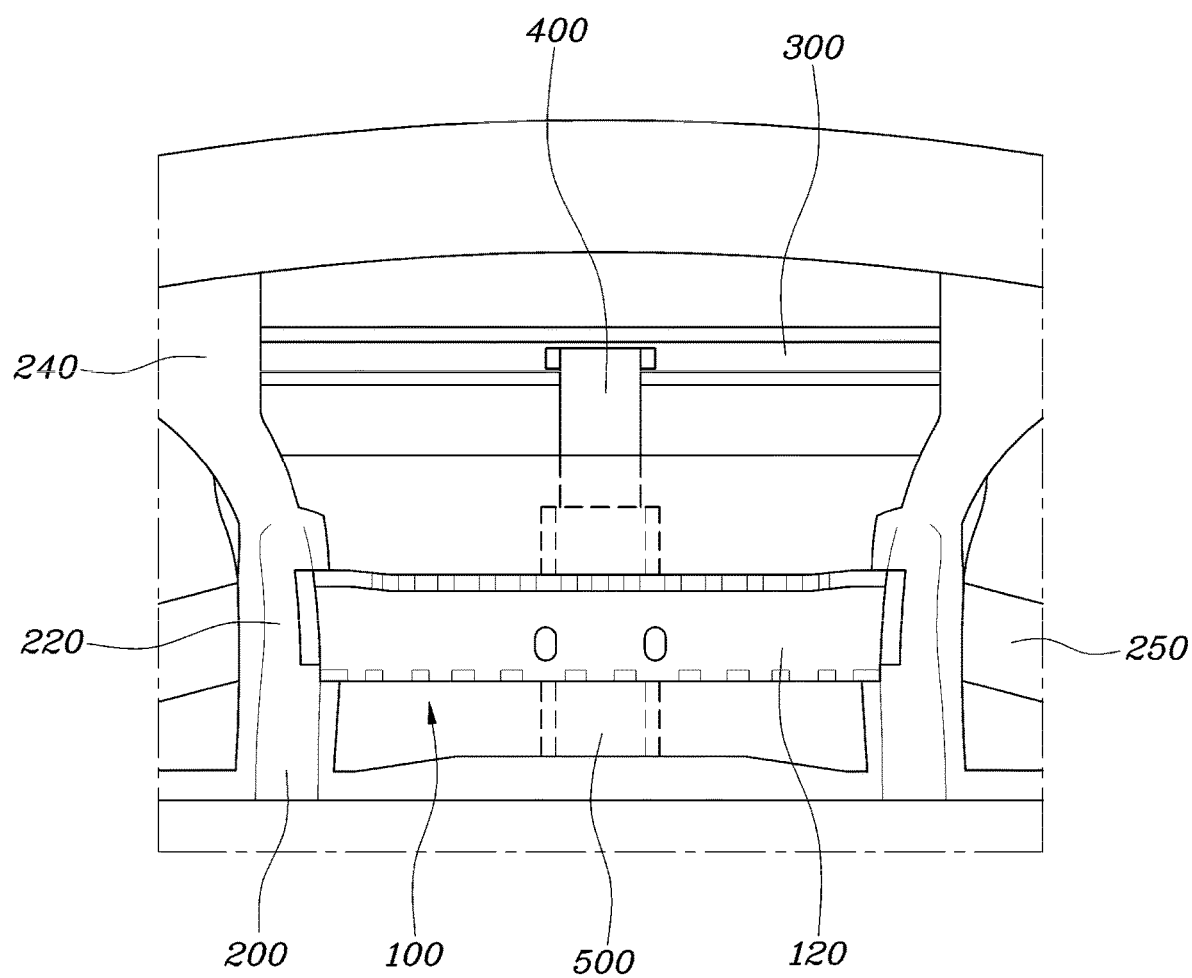
Figure 3:
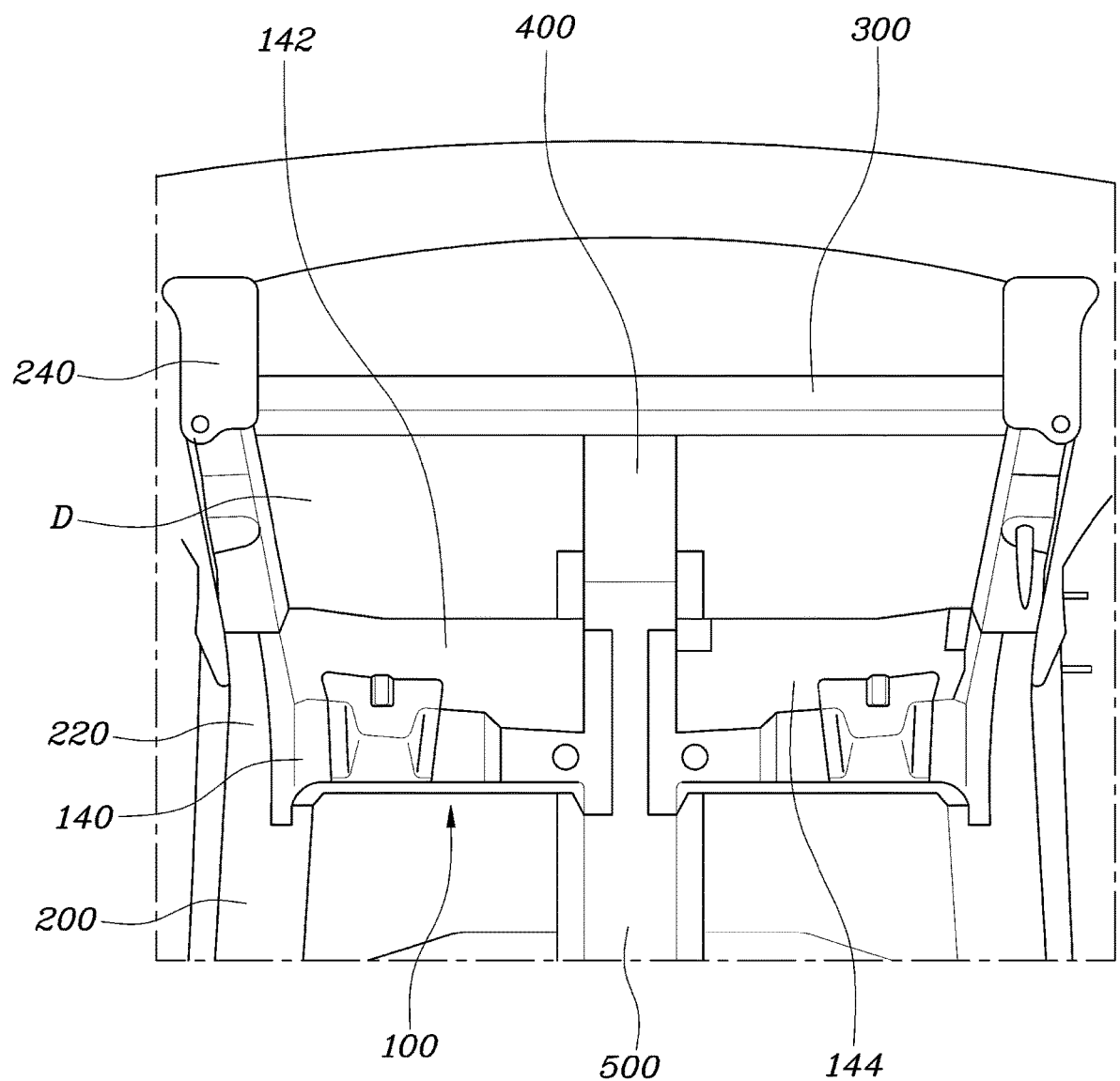

In order that the disclosure may be well understood, there will now be described various forms thereof, given by way of example, reference being made to the accompanying drawings, in which:

FIG. 1 is a perspective view of a front body for a vehicle according to one form of the present disclosure; and FIGS. 2 and 3 are views showing a front dash cross member of the front body for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a perspective view of a front body for a vehicle according to one form of the present disclosure, and FIGS. 2 and 3 are views showing a front dash cross member of the front body for a vehicle according to another form of the present disclosure.

FIG. 1 is a perspective view of a front body for a vehicle according to one form of the present disclosure. The front body for a vehicle includes: a front dash cross member 100 disposed under a dash panel D, having both ends respectively connected to front side members 200 positioned at both sides, and extending in a transverse direction of the vehicle; a front lower cross member 300 disposed at a front lower portion of the vehicle, having both ends respectively connected to the front side members 200 positioned at both sides, and extending in the transverse direction of the vehicle; a front center support member 400 that extends in a longitudinal direction of the vehicle, is located under an engine room of the vehicle and has a front end connected to the front lower cross member 300 and a rear end connected to the front dash cross member 100; and a center member 500 having a front end connected to front dash cross member 100, and extending rearward along a floor of the vehicle.

Since vehicles with a narrow engine room and a short front overhang such as a small-sized electric vehicle may have insufficient crashworthiness, the present disclosure provides a new body structure to cope with this problem.

In order to achieve this technological object, the present disclosure proposes a plan that uses the front side members 200 and a fender apron member A that are used as body structures in the related art.

In one form, the front dash cross member 100 has both ends respectively connected to the front side members 200 positioned at both sides, and extends in the transverse direction of the vehicle. The vehicle has a floor panel and the front dash cross member 100 is positioned ahead of the floor pane, in more detail, at the lower end of a dash panel D. The front dash cross member 100 extends in the transverse direction of the vehicle and has both ends respectively connected to the front side members 200 positioned at both sides.

The front dash cross member 100, as shown in FIGS. 2 and 3, is composed of an inner panel 120 and an outer panel 140, thereby forming a closed cross-section. Accordingly, the front dash cross member 100 faithfully plays a role as a load path, transmits an input shock to the front side members 200 by distributing the shock to the left and right of the vehicle, and guides again the transmitted shock to propagate in the longitudinal direction of the vehicle through the front side members 200.

In detail, the front dash cross member 100 may be configured, as shown in FIGS. 2 and 3. FIGS. 2 and 3 are views showing the front dash cross member 100 of the front body for a vehicle according to one form of the present disclosure.

In one form, the front dash cross member 100 includes an inner panel 120 positioned inside and an outer panel 140 positioned outside with respect to the floor panel, and a closed cross-section can be formed by combining the inner panel 120 and the outer panel 140. Further, the inner panel 120 of the front dash cross member 100, as shown in FIG. 2, may have a shape covering the upper end of a center member 500 to be described below.

Further, the outer panel 140 of the front dash cross member 100 is, as shown in FIG. 3, composed of a left panel 142 and a right panel 144, and the ends facing each other of the left panel 142 and the right panel 144 may be respectively coupled to both side ends of the center member 500.

The floor panel may be a flat panel to use the interior and the center member 500 may be coupled to the bottom of the floor panel to not to spoil the aesthetic appearance of a space. Accordingly, the inner panel 120 of the front dash cross member 100, as shown in FIG. 2, is formed in a shape covering the upper end of the center member 500 to be described below, thereby making the interior floor as flat as possible. The outer panel 140 of the front dash cross member 100, as shown in FIG. 3, is composed of the left panel 142 and the right panel 144 under the floor panel. The ends facing each other of the left panel 142 and the right panel 144 may be coupled respectively to both side ends of the center member 500 protruding downward. According to this structure, it is possible to maximally use the interior and to secure a load path by using the inner and outer panels as members of the closed cross-section.

In one form, the front lower cross member 300 is disposed at a lower portion of the front of the vehicle, has both ends respectively connected to the front side members 200 positioned at both sides of the vehicle, and extends in the transverse direction of the vehicle. In another form, the front center support member 400 extends in the longitudinal direction of the vehicle and is located under the engine room of the vehicle. In other form, the front center support member 400 has a front end connected to the front lower cross member 300, and a rear end connected to the front dash cross member 100.

The front lower cross member 300 and the front center support member 400 transmit a shock input from the front such that the shock can be sufficiently absorbed in the longitudinal direction throughout the vehicle by transmitting the shock not only to the sides, but also the center portion of the vehicle, and function as a support for preventing or reducing deformation of the interior in a collision due to deformation of the front end of the vehicle.

In detail, the front lower cross member 300, as shown in FIG. 1, is disposed at a lower portion of the front of the vehicle, has both ends respectively connected to the front side members 200 positioned at both sides, and extends in the transverse direction of the vehicle.

Meanwhile, the front side members 200 of the vehicle may each have a first connection point 220 and a second connection point 240 positioned forward further than the first connection point 220. An end of the front dash cross member 100 is connected to a side of the first connection point 220 and a first connection member 250 may extend outward in the vehicle and may be connected to a door chamber member 260. Accordingly, a shock input in a front collision of the vehicle propagates to both sides through the front side members 200. Further, the shock propagates to the center member 500 and the front dash cross member 100 through the front lower cross member 300 and the front center support member 400.

Further, the shock propagating to the front dash cross member 100 keeps propagating outward in the vehicle through an additional member, thereby being transmitted to the door chamber member 260.

Accordingly, a shock due to a front collision is absorbed in the longitudinal direction throughout the vehicle through the door chamber member 260, the front side members 200, and the center member 500. Further, the front of the interior is supported by the front dash cross member 100 and the connection member 280, thereby preventing deformation of a passenger seat. Further, the front of the interior is supported again by the door chamber member 260, the front side members 200, and the center member 500, thereby securely preventing deformation of the passenger seat.

Further, the second connection point 240 is positioned forward further than the first connection point 220 of the front side members 200, the front lower cross member 300 is connected to a side of the second connection point 240, and the connection member 280 is connected to the other side of the second connection point 240. Further, the connection member 280 may extend outward in the vehicle and may be connected to the fender apron member A. Further, the connection member 280 may extend along the front end profile of a front wheel housing W. Here, the second connection point 240 of the front side member 200 may be a front end of the front side member 200 that is adjacent to a bumper back beam joint 201.

According to this structure, it is possible to prevent the phenomenon that the front wheels of the vehicle deform while pushing the passenger seat inward. Further, by connecting the front side members 200, the fender apron member A, and the front lower cross member 300, it is possible to make the front structure of the vehicle stronger and use even the fender apron member A as a load path.

Further, this structure is optimized as a structure that forms a load path by organically using all the members not only in a front collision, but also a side collision and an offset collision.

On the other hand, the center member has a front end connected to the center portion of the front dash cross member 100 and extends rearward at the center of the vehicle floor. Further, the rear end of the front center support member, as shown in FIGS. 1 to 3, is directly connected to the front end of the center member 500 and the front end of the center member 500 may be connected to the center portion of the front dash cross member 100. Accordingly, it is possible to securely support a front collision at the center of the vehicle. Further, the front dash cross member 100, the front center support member 300, and the center member 500 have a member shape having a closed cross-section and are directly and indirectly connected to each other, thereby being able to form a load path for a front collision and a side collision.

The front body for a vehicle of the present disclosure efficiently reinforces crashworthiness and body stiffness of vehicles having a small engine room and front overhang such as a small electric vehicle.

Although the present disclosure was provided above in relation to specific forms shown in the drawings, it is apparent to those skilled in the art that the present disclosure may be changed and modified in various ways without departing from the scope of the present disclosure.

What is claimed is:

1. A front body for a vehicle, comprising:
a front dash cross member disposed under a dash panel, having first and second ends respectively connected to front side members positioned at both sides of the vehicle, and configured to extend in a transverse direction of the vehicle;
a front lower cross member disposed at a front lower portion of the vehicle, having first and second ends respectively connected to the front side members, and configured to extend in the transverse direction of the vehicle;
a front center support member extending in a longitudinal direction of the vehicle and located under an engine room of the vehicle, where the front center support member includes a front end connected to the front lower cross member and a rear end connected to the front dash cross member; and
a center member having a front end connected to the front dash cross member, and configured to extend rearward along a floor of the vehicle.

2. The front body of claim 1, wherein the front side members each have a first connection point and a second connection point positioned forward further than the first connection point.

3. The front body of claim 2, wherein:
the first connection points of the front side members are respectively connected to a lower portion of a dash panel, and
the front dash cross member is connected to the first connection points of the front side members.

4. The front body of claim 2, wherein:
the second connection points of the front side members correspond to front ends of the front side members and the front ends of the front side members are adjacent to a bumper back beam joint, and
the front lower cross member is connected to the second connection points of the front side members.

5. The front body of claim 4, wherein:
at least one second connection point among the second connection points of the front side members is connected to a fender apron member by a connection member, and
the connection member extends along a front end profile of a front wheel housing.

6. The front body of claim 5, wherein:
a lower end of the connection member is coupled to a top part of the front side members, and
the front lower cross member is connected to a side part of the front side members, the side part configured to face the engine room of the vehicle.

7. The front body of claim 1, wherein:
the rear end of the front center support member is directly connected to the front end of the center member, and
the front end of the center member is connected to a center portion of the front dash cross member.

8. The front body of claim 1, wherein the front dash cross member, the front center support member, and the center member each have a closed cross-section and are directly or indirectly connected to each other, thereby forming a load path for a front collision and a side collision.

9. The front body of claim 1, wherein:
the front dash cross member includes an inner panel positioned inside and an outer panel positioned outside, and
a closed cross-section is formed by combining the inner panel and the outer panel.

10. The front body of claim 9, wherein the inner panel of the front dash cross member is configured to cover an upper end of the center member.

11. The front body of claim 9, wherein:
the outer panel of the front dash cross member includes a left panel and a right panel,
the left panel and the right panel each have an end portion, and
the end portions of the left and right panels face to each other and are respectively coupled to the center member.

* * * * *